United States Patent [19]

Bischof et al.

[11] Patent Number: 5,629,093

[45] Date of Patent: May 13, 1997

[54] TRANSPARENT MULTILAYER FILM AND ITS USE FOR PROTECTION OF DATA ON DOCUMENTS AS WELL AS A TAMPER-PROOF LABEL

[75] Inventors: Katharina J. Bischof, Duesseldorf; Luigi Pastore, Grevenbroich; Wilhelm Kuester, Kaarst, all of Germany; Lynn E. Faykish, Minnepolis, Minn.

[73] Assignee: Minnesota Mining and Manufacturing Company, St. Paul, Minn.

[21] Appl. No.: 499,110

[22] Filed: Jul. 6, 1995

[30] Foreign Application Priority Data

Jul. 8, 1994 [DE] Germany .................. 44 24 148.8

[51] Int. Cl.$^6$ .................................................. B32B 9/04
[52] U.S. Cl. ................. 428/411.1; 428/212; 428/500; 428/913; 428/41.3; 428/42.3; 283/72
[58] Field of Search ................. 428/145, 411.1, 428/913, 914, 40, 42, 212, 500; 283/72

[56] References Cited

U.S. PATENT DOCUMENTS

| | | | |
|---|---|---|---|
| 3,643,216 | 2/1972 | Greenaway et al. | 340/146.3 |
| 3,801,183 | 4/1974 | Sevelin et al. | 350/105 |
| 3,925,584 | 12/1975 | Suzuki et al. | 428/40 |
| 4,121,003 | 10/1978 | Williams | 428/40 |
| 4,184,701 | 1/1980 | Franklin et al. | 283/9 |

(List continued on next page.)

FOREIGN PATENT DOCUMENTS

| | | | |
|---|---|---|---|
| 0156618 | 10/1985 | European Pat. Off. | B42D 15/02 |
| 0170712 | 2/1986 | European Pat. Off. | G09F 3/02 |
| 0253089 | 1/1988 | European Pat. Off. | G06K 19/08 |
| 0398635 | 11/1990 | European Pat. Off. | G09F 3/02 |
| 0401466 | 12/1990 | European Pat. Off. | G06K 19/16 |

(List continued on next page.)

*Primary Examiner*—William Krynski
*Attorney, Agent, or Firm*—Gary L. Griswold; Walter N. Kirn; Peter L. Olson

[57] ABSTRACT

The invention provides a transparent multilayer film comprising a cover layer, a destructible or irreversibly deformable layer, respectively, a pattern of adhesion-regulating material between the cover layer and the damagable layer, and an adhesive layer for bonding with a substrate. The damagable layer has a thickness of at least 10 µm. The following relationship applies to the cohesive strength as well as the adhesion between the layers:

a and d>c>b
whereby
- a is the adhesive strength between cover layer (1) and layer (3) in the areas where no adhesion-regulating material (2) is present,
- b is the adhesive strength between cover layer (1) and layer (3), in the areas where adhesion-regulating material (2) is present,
- c is the cohesive strength of layer (3), and
- d is the adhesive strength between layer (3) and adhesive layer (5).

The invention also provides for the use of the transparent multilayer film for protection of data on documents, as well as its use as a tamper-proof label. The invention also provides for a tamperproof document or label, comprising a multilayer film of the present invention.

22 Claims, 8 Drawing Sheets

U.S. PATENT DOCUMENTS

| | | | |
|---|---|---|---|
| 4,429,015 | 1/1984 | Sheptak | 428/201 |
| 4,630,891 | 12/1986 | Li | 350/105 |
| 4,721,638 | 1/1988 | Matsuguchi et al. | 428/40 |
| 4,763,931 | 8/1988 | Matsuguchi et al. | 283/108 |
| 4,876,123 | 10/1989 | Rivera et al. | 428/34.2 |
| 5,042,842 | 8/1991 | Green et al. | 283/101 |
| 5,061,535 | 10/1991 | Kreckel et al. | 428/42 |
| 5,080,463 | 1/1992 | Faykish et al. | 359/536 |
| 5,082,702 | 1/1992 | Alband | 428/36.92 |
| 5,169,707 | 12/1992 | Faykish et al. | 428/195 |

FOREIGN PATENT DOCUMENTS

| | | | |
|---|---|---|---|
| 0419241 | 3/1991 | European Pat. Off. | B41M 3/14 |
| 0461337 | 12/1991 | European Pat. Off. | G09F 3/02 |
| 2451081 | 10/1980 | France | G09F 3/10 |
| 2511367 | 10/1975 | Germany | B44F 1/12 |
| 2803434 | 8/1979 | Germany | C09J 7/02 |
| 2952322 | 7/1981 | Germany | B44F 1/12 |
| 3534557 | 4/1986 | Germany | C09J 7/02 |
| 3534558 | 4/1986 | Germany | C09J 7/02 |
| 3608907 | 10/1986 | Germany | C09J 7/02 |
| 3941257 | 6/1991 | Germany | G09F 3/10 |
| 2111430 | 7/1983 | United Kingdom | B42D 15/02 |
| WO93/05124 | 3/1993 | WIPO . | |

TRANSPARENT MULTILAYER FILM AND ITS USE FOR PROTECTION OF DATA ON DOCUMENTS AS WELL AS A TAMPER-PROOF LABEL

TECHNICAL FIELD

The present invention concerns a transparent multilayer film which has at least one damagable layer, in particular an easily destructible layer or an irreversibly deformable layer. The transparent multilayer film of the invention is especially well-suited for protection of data on documents as well as for use as a tamper-proof label, and particularly for durable protection of labels and documents.

BACKGROUND OF THE INVENTION

Different types of films and similar constructions are known which are intended to be used to protect writing, especially data on documents, from attempts at tampering or to protect labels, such as price tags, from manipulation such as removing and readhering.

A known technology for protection of documents, such as identification cards and driver's licenses, consists of a multilayer film where microspheres are imbedded in a binder in one layer. Directly under the microspheres is a retroreflective customer-specific printing which can be observed under retroreflective conditions. Under this binder layer is a layer of pressure sensitive adhesive or heal-activated adhesive that serves to attach the film to the document. This type of construction, known, for example, from U.S. Pat. No. 3,801, 183, U.S. Pat. No. 4,630,891, U.S. Pat. No. 5,080,463 and U.S. Pat. No. 5,169,707, offers a high degree of protection against tampering because the technology used in the retroreflective customer-specific printing cannot be imitated with traditional equipment. These constructions have the disadvantage, however, in that in order to view the customer-specific printing, equipment for retroreflective viewing is necessary.

DE-C-25 11 367 describes a tamper-proof recording medium comprising several layers where the document is laminated between two films, and where a pattern of adhesion-reducing coating has been applied to either the film or the document, so that very little or no adhesive bond is formed between the film and the document in areas where the adhesion-reducing coating is present. Normally, an attempt to tamper with a construction of this type would result in destruction of the document. In this case as well, however, professional tamperers are capable of removing the film carefully so that the substrate is not damaged.

The 3M Company brochure "3M ID Security Laminate Series 3000" Order No. 75-0500-00377-3 (24.5) IR (1992) from Minnesota Mining and Manufacturing Company describes a security laminate for use when only a certain amount of security is required. The laminate consists of two layers, between which lies a customer-specific printing which cannot be photocopied and which is destroyed when delamination is attempted.

Multilayer films for increasing the tamper-resistance of documents, where the tamper-resistance depends on the integrity of an intermediate layer having certain optical properties such as a kinegram or a hologram, are described in EP-A-253 089 and EP-A-401 466. The layer with optical properties is used in combination with a usual film, which itself has only a limited level of tamper-resistance. During an attempt at tampering, the hologram would be destroyed. The film in the area of the hologram is not transparent, however, and its extension over the entire document surface is, aside from the expense, not desirable because of the lack of transparency.

U.S. Pat. No. 4,876,123 and U.S. Pat. No. 5,082,702 describe tamper-proof films and tapes which are not transparent. The multilayer constructions are destroyed during attempts at tampering, both sides of the separated film layers showing a color printing which was originally concealed. A laminate which works in a similar way is described in U.S. Pat. No. 4,429,015 where fibers are pulled off of the document when attempts are made to remove the cover film and where the parts cannot be laminated together again without visible damage.

DE-A-28 03 434 describes a self-adhesive clear film having a layer of printed adhesive. When the document is tampered with, this printing remains on the document substrate. When a tamperer desires to exchange a photograph, for example, then the printed pattern must be reproduced on the new photo, a task which is relatively simple for a professional tamperer.

FR-A-2 451 081 describes a multilayer safety laminate for documents which contains an intermediate layer containing ink-filled microcapsules. Upon tampering, the capsules break and lead to discoloration of the document. This construction has the disadvantage, however, that the microcapsules reduce the transparency of the film and that normal use of the document can lead to breakage of the microcapsules.

DE-A-36 08 907 describes an adherable material for labels where an underlying tearable layer is destroyed when a surface layer is manually removed. This material is non-transparent, as the easily tearable layer is preferably an aluminum vapor coating which has adhesive on both sides, the adhesives differing in their adhesive strength. Between the tearable layer and the lower adhesive layer is a pattern of an adhesion-reducing coating. A cover layer can be printed as well and the entire construction used as a tamper-proof tape or safety label. Removal of the tape or label leads to an irreversible destruction of the largely two-dimensional nontransparent metal layer. Similar multilayer constructions with largely flat, very thin, non-transparent frangible layers are known from U.S. Pat. No. 3,925,584 and EP-A-170 712.

Further descriptions of tamper-proof labels can be found in U.S. Pat. No. 4,121,003 and U.S. Pat. No. 4,184,701. These labels have a transparent cover layer which has a printed pattern on its inner surface. The printed pattern is destroyed when the cover layer is removed.

U.S. Pat. No. 4,721,638 describes a non-transparent sticking material for preventing resticking, having an adhesive layer, a second layer laminated on one mail surface of the adhesive layer, a peeling agent layer laminated on the second layer and a first layer laminated on the peeling agent layer. The second and first layers are adhered temporarily via the peeling agent layer. The first layer once separated from the second layer cannot be restuck. The non-transparent sticking material is designed to avoid the use of polyester film and metallization in the construction.

A method of manufacturing tamper-proof documents which is related to one of the previously described multilayer films is described in DE-C-29 52 322. In this process, a document is laminated with a polyethylene film which has an adhesive coating comprising a radiation cross-linkable mass of ethylenically unsaturated oligomers or polymers based on urethane-modified polyepoxides. The film is laminated to the document in such a way that the crosslinkable mass comes in contact with the document. The laminate is then exposed to a crosslinking radiation (UV radiation). In this case, the document is provided with a very high level of protection from tampering. However, treatment of the laminate with UV radiation is necessary, which in practice would require undesirable investment in equipment and associated safety measures because every distribution point which issues such documents would need such UV-radiation equipment.

In summary, none of the numerous solutions to the problem provided by the state-of-the-art, described above, provides a satisfactory multilayer film which combines an especially high degree of tamper-resistance with transparency as well as a simple, relatively inexpensive method of manufacture and none has fulfilled the requirements laid out for protecting the data on documents and labels.

One object of the invention is thus to provide a new multilayer film, intended especially for the protection of data on documents as well as for tamper-proof labels, which shows a high degree of tamper-resistance, that is, where tampering can be detected even after alterations have been made by a professional tamperer, and which in addition is simple and inexpensive to manufacture.

SUMMARY OF THE INVENTION

In solution to the above problem, the invention provides a transparent multilayer film having a cover layer, damagable layer, a pattern of adhesion-regulating material between said layers, and a first adhesive layer for bonding with a substrate, said first adhesive layer being present on the surface of the film opposite that of the cover layer, characterized in that the damagable layer 3 has a thickness of at least 10 μm and that the cohesive strength of damagable layer 3 as well as the adhesive strengths between the layers have the following relationship:

a and d>c>b whereby a is the adhesive strength between cover layer 1 and damagable layer 3 in the areas where no adhesion-regulating material 3 is present, b is the adhesive strength between cover layer 1 and damagable layer 3, in the areas where adhesion-regulating material 2 is present, c is the cohesive strength of damagable layer 3, and d is the adhesive strength between damagable layer 3 and first adhesive layer 5.

A further object of the invention is to provide a method of use of these transparent multilayer films for protection of data on documents as well as a method of use as a tamper-proof label.

An additional object of the invention is a tamper-proof document or label, comprising a multilayer film of the present invention bonded by means of the first adhesive layer 5 to a data carrier 6, whereby the adhesive strength between the adhesive layer 5 and the data carrier 6 is about the same as or larger than the cohesive strength c of the layer 3 and/or the cohesive strength e of the adhesive layer 5.

The irreversibly damagable layer of the multilayer film of the present invention may be a destructible or an irreversibly deformable layer (hereafter called simply the "damagable layer") and comprises in one embodiment a hot-melt adhesive (heat-activated adhesive), for example, an ethylene vinyl acetate (EVA) copolymer, an ethylene acrylic acid copolymer, an ethylene methacrylic acid copolymer, a polyester, a polyamide or a polyurethane, or a pressure-sensitive adhesive. The term "destructible" indicates in the context of this application that the layer may be irreversibly damaged, e.g. by brittle fracture or by tearing, so that a continuous layer no longer exists. The term "irreversibly deformable" indicates in the context of this application that the layer may be irreversibly damaged by deformation, e.g. by plastic extension, whereby the layer need not be completely destroyed.

In a further embodiment, the multilayer film of the present invention can also have an adhesive layer between the cover sheet or pattern of adhesion-regulating material, respectively, and the damagable layer. In this embodiment, there can be a further pattern of adhesion-regulating material between the damagable layer and the substrate-bonding adhesive layer, this second pattern being non-superimposable with the first pattern of adhesion-regulating material between the damagable layer and the cover layer.

In the two latter described embodiments, the damagable layer need not be adhesive in nature itself, it consists preferably of a non-oriented polypropylene or a linear low density polyethylene (LLDPE), but can also consist of one of the previously-mentioned hot-melt adhesives. In one variation of this embodiment, the damagable layer can consist of a brittle, frangible material. This material can contain a filler, such as glass microspheres, which increases its brittleness.

The cover layer of the multilayer film of the invention is normally a durable, dimensionally stable, wear, tear and abrasion-resistant polymeric film, such as a polyethylene terephthalate (PET) film, which can be corona-treated or treated with primer.

The adhesion-regulating material can be an adhesion-reducing or an adhesive repellent material, applied in a pattern located between the damagable layer and the cover layer and can be located as well between the damagable layer and the substrate-bonding adhesive layer, in cases where the adhesive layer is present.

The adhesive layers, which may be found on both sides of the damagable layer, comprise preferably a layer of pressure sensitive adhesive (PSA) or hot-melt adhesive.

In a further embodiment, the damagable layer is treated, for example, by corona discharge, on the side facing the cover layer or on both sides, in order to improve adhesion to adjacent layers.

In a preferred embodiment of the invention, a verification marking, for example a customer-specific printing, is present within the multilayer film. The verification marking is preferably present on the damagable layer, namely between the damagable layer and the adhesive layer which bonds, the multilayer film to the substrate, or between the bonding adhesive layer and the substrate, or between the adhesion regulating material/cover layer and the damagable layer. It is preferred if the verification marking is irreversibly damaged when the damagable layer is damaged by tampering.

The transparent multilayer film of the invention comprises a cover layer, a damagable layer, a pattern of an adhesion-regulating material between the damagable layer and the cover layer, and an adhesive layer which bonds the film to the substrate. These elements are described hereafter in detail.

The upper layer of the transparent multilayer film of the present invention is a cover layer made of an abrasion resistant, preferably, a durable, wear and tear resistant material. A material which is preferred for this purpose is durable, abrasion resistant film, for example a polyethylene terephthalate (PET) polymeric film which normally has good dimensional stability, mechanical properties and solvent resistance. The abrasion resistant cover layer protects the underlying layers of the laminate and the document itself from wear, moisture and other undesirable influences during the length of its entire life. Such documents intended for long-term use include driver's licenses, passports and personal identification papers. The film seals the document, thus protecting it from undesirable changes which can occur due to constant use. In order to provide the laminate and the document, respectively, with sufficient stiffness and resistance to folding, the cover layer preferably has a thickness of from 10 to 200 μm. Especially preferred is a thickness from about 15 to about 150 μm. In order to improve adhesion to the underlying layer, and to provide the adhesive strength prescribed by the present invention, the film is treated with corona discharge or treated with a primer. The primer can be applied in the customary manner, for example with a coating rod, at a usual thicknesses of up to about 1 μm.

On the inner side of the cover layer of the transparent multilayer film of the present invention is a pattern of adhesion-regulating material. This adhesion reducing or adhesive repellent coating, applied in a non-continuous fashion, covers only part of the surface and can generate differing surfaces on the inner side of the construction. These differing surfaces also have differing adhesion characteristics. While the adhesion strength is high between the cover layer and the adjacent damagable layer (in one embodiment an adhesive layer provided between the two layers) in the areas where adhesion-regulating material is absent, the adhesive strength is less than the cohesive strength of the damagable layer, preferably substantially less, for example, about 1/10 or less, in areas where the adhesion-regulating material is present. In these areas, there is often practically no adhesion between said layers.

Several materials can be used as adhesion-reducing or adhesive repellent substances, in order to create this pattern. Examples of these materials include carbamates like polyvinyl octadecyl carbamate, available under the name "Kalle release coat K" from Hoechst AG, Germany, or "Escoat P 20" from Anderson Development Company, U.S.A. Further suitable materials include silicone systems like UV-curable free-radical silicone-acrylate release coatings, silicone addition systems, silicone condensation systems and cationically-curing silicone systems. The pattern of this material is applied to the inner side of the cover layer, preferably after the cover layer has been corona-treated or primed as mentioned. A more complete description of both the silicone and non-silicone based adhesion-regulating materials and their use to create patterns can be found in U.S. Pat. No. 5,061,535. The type of pattern used in the present invention is not critical. Every pattern such as crossed lines, dot patterns, checkerboard patterns or diamond-shaped patterns can be used. The pattern covers preferably 5 to 80% of the surface of the cover layer. Especially preferred is 20 to 60% of the surface of the cover layer.

An important element of the transparent multilayer film of the invention is the destructible or irreversibly deformable layer which lies under the cover layer and under the pattern of adhesion-regulating material. In one embodiment of the invention, this layer comprises a hot-melt adhesive or a pressure-sensitive adhesive. Especially suitable examples of the heat-activated adhesive include ethylene vinyl acetate (EVA) copolymers, ethylene acrylic acid copolymers, ethylene methacrylic acid copolymers, polyesters, polyamides and polyurethanes. A special example of a pressure-sensitive adhesive is an adhesive based on copolymers of acrylic acid esters. Preferred for this embodiment is an ethylene vinyl acetate (EVA) copolymer with an ethylene to vinyl acetate ratio of about 85:15, for example, the commercially available Guttacoll PE 90 or Elvax 550. It is most practical if the material is corona treated for improved adhesion to adjacent layers.

Adhesives suitable for use as the adhesive layer on the surface of the damagable layer opposite that adjacent to the cover layer and which forms the bond to the substrate, include the usual, well-known pressure-sensitive, hot-melt (heat activatable) or reactive adhesives. Preferred are pressure-sensitive adhesives (PSA), for example, those based on acrylates which can be tackified optionally by known methods. These adhesive layers can be introduced into the multilayer film as a transfer tape, using methods which in themselves are known, or can be coated from organic solution or aqueous dispersion on adjacent layers. A high adhesion of the damagable layer to the adhesive layer is also essential to the present invention.

In one embodiment, a further layer of adhesive may be placed between the damagable layer and the cover layer or the pattern of adhesion-regulating material, respectively. This layer can be made of the same adhesive which is used to bond the damagable layer to the substrate, or of another adhesive.

When layers of adhesive are provided both above and below the damagable layer, then other materials can be used, in addition to the hot-melt adhesives or pressure-sensitive adhesives mentioned previously, which themselves are not adhesive. Examples are layers made of non-oriented polypropylene or linear low density polyethylene (LLDPE).

Within the context of the present invention, it is of great significance that the damagable layer has a limited cohesive strength, this cohesive strength being less than the adhesion of this layer to the cover layer in areas where no adhesion-regulating-material is present, and also less than the adhesion to the adhesive layer present on its opposite surface. The damagable layer has a lower cohesive strength than the durable cover layer. The damagable layer is thus the weakest point in the multilayer film and, thus, is the predetermined failure point of the film. The layer is easily deformed, meaning that it is stretched in an irreversible, non-elastic manner when attempts are made to remove the film from a substrate (a data carrier or document), so that manipulation is visually easy to recognize. An irreversibly deformable layer has the advantage that inadvertant damage by flexing of the document can be reduced. Further, reinstatement of the irreversibly deformed layer is practically impossible.

In a further embodiment, the damagable layer comprises a brittle, frangible material which breaks as a results of tampering attempts. Examples of materials suitable for this embodiment of the invention include acrylic resins which are self-crosslinked through acrylamide groups, for example the commercially available products Jagotex SV 211 and Jagotex SV 212 from Ernst Jfi. ger GmbH, Germany. A transparent filler which further increases the brittleness, such as glass microspheres, can be built into this layer. The glass microspheres result in an inhomogeneous layer and increase its tendency to break easily when forces are applied, especially tensilizing forces.

The damagable layer is preferably pretreated on its side facing the cover layer, or on both sides, to improve bonding to adjacent layers. Suitable pretreatment processes include corona discharge treatment or treatment with primers.

Further, for the purpose of increasing the adhesion differences, a second pattern of adhesion-regulating material can be provided between the damagable layer and the adhesive layer lying under it, this second pattern being arranged so that it is non-superimposable with the pattern of adhesion-regulating material between the damagable layer and the cover layer.

The damagable layer of the multilayer film of the present invention is a pronounced three-dimensional transparent layer in contrast to many constructions known in the state-of-the art, especially in the case of labels where the damagable layer is largely flat (two-dimensional), examples being a vapor-coated metal layer or a printed layer, hologram, kinegram or the like. The use of a transparent damagable layer makes transparency of the entire laminate possible. The damagable layer in the transparent multilayer film of the present invention has a thickness of at least 10 µm, whereby the thickness ranges from 10 µm to 500 µm, preferably 15 µm to 100 µm and, especially preferred, 20 µm to 60 µm. The three-dimensional nature of the damagable layer is responsible for the superior tamper-proof properties of the multilayer film of the invention. In the first embodiment of this layer described, the layer undergoes an irreversible stretching when tampering attempts are made. A tampering attempt can be easily recognized because the layer is stretched differently in different areas, these being prescribed by the pattern of adhesion-regulating material. The stretching of the damagable layer cannot be reversed and remains easily visible as uneven waves after the film has been reapplied to the substrate.

If attempts to remove the laminate continue and the stretching of the damagable layer continues, the laminate finally breaks. This occurs at its weakest point. Before the stretching began, the damagable layer had the lowest strength within the multilayer film, so that the break would occur within this -layer. The cohesive strength of this material can increase, however, as a result of stretching and simultaneous orientation of the macromolecules in the damagable layer, so that one or more other areas of the film have similar or less cohesive strength than the damagable layer. For this reason, the film can tear, for example, through the damagable layer and the adhesive layer (whose cohesive strength can be similar to that of the stretched damagable layer). It can also fail by partially separating from the substrate (document) after the damagable layer has been stretched. The substrate itself can also alelaminate when its cohesive strength is low.

In the case of the brittle frangible layer, instead of an irreversible stretching of the previously described embodiment, an irregularly broken edge remains, the parts of which cannot be perfectly fit together again, thus rendering this embodiment also irreparably destroyed.

In a preferred embodiment of the invention, a verification marking is present within the multilayer film, preferably immediately beneath the damagable layer, or alternatively between the lower adhesive layer and the document, or above the damagable layer. This can be a customer-specific verification marking, made, for example, using ink, thus creating a logo or a specific pattern such as the eagle symbol of the Federal Republic of Germany. The ink can be applied, for example, by screen printing or flexographic printing techniques. The verification marking can be a frame-like pattern or can be a pattern of transparent lines. The verification marking can be such that it is visible with the naked eye or with the assistance of a UV lamp.

The verification marking serves with respect to the current invention primarily as a means of recognizing authenticity of the film. It can also represent an element contributing to the tamper-proof nature of the film. This is being primarily provided in the present invention by the damagable layer, however.

The multilayer film of the invention can be provided with a removable release paper before use so that the film can be stored in stacks or roll form.

BRIEF DESCRIPTION OF THE DRAWINGS

The invention is described as follows with reference to the attached drawings. These are:

DETAILED DESCRIPTION OF THE INVENTION

Figure 1:
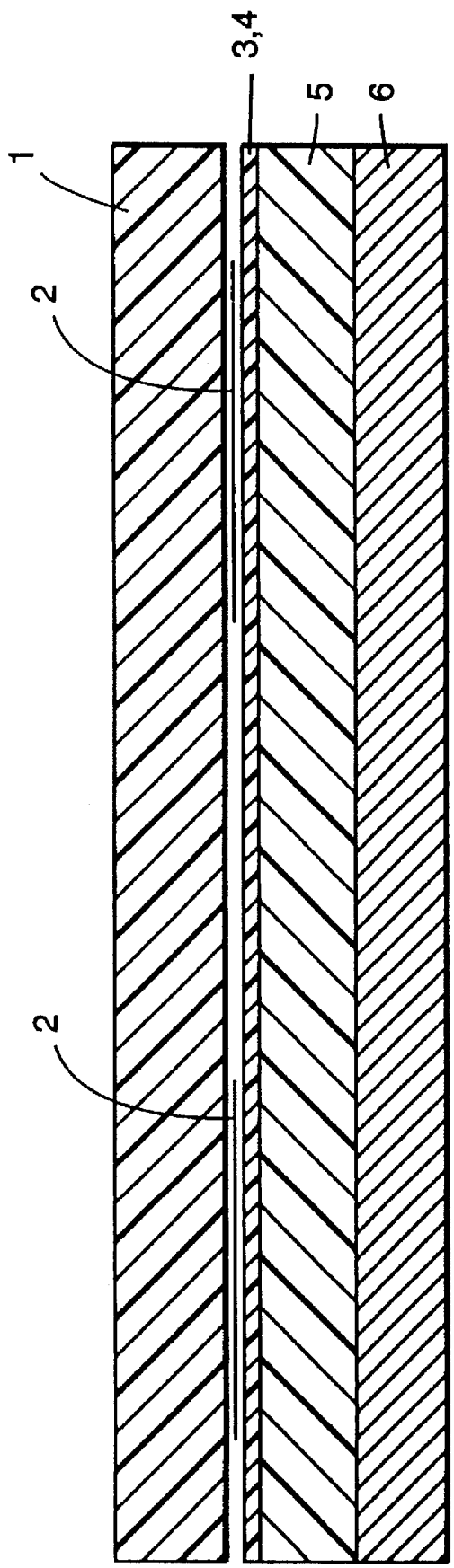
Figure 2:
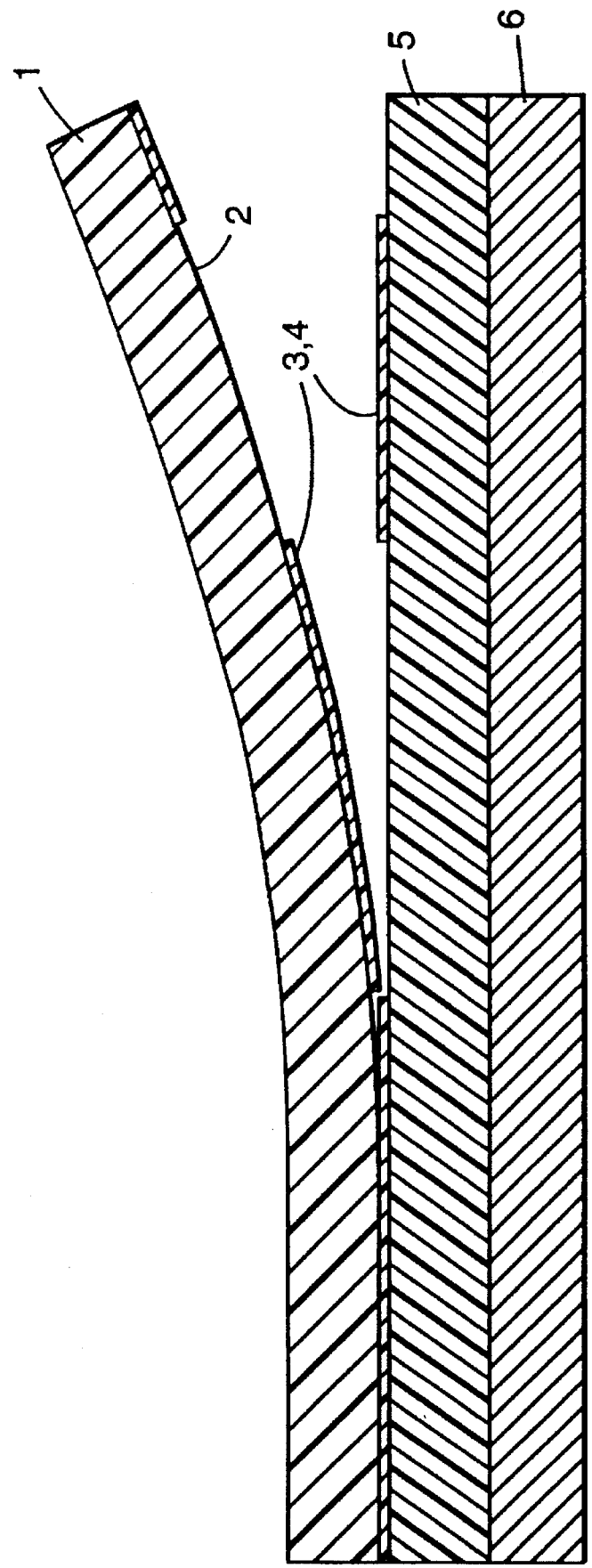
Figure 3:
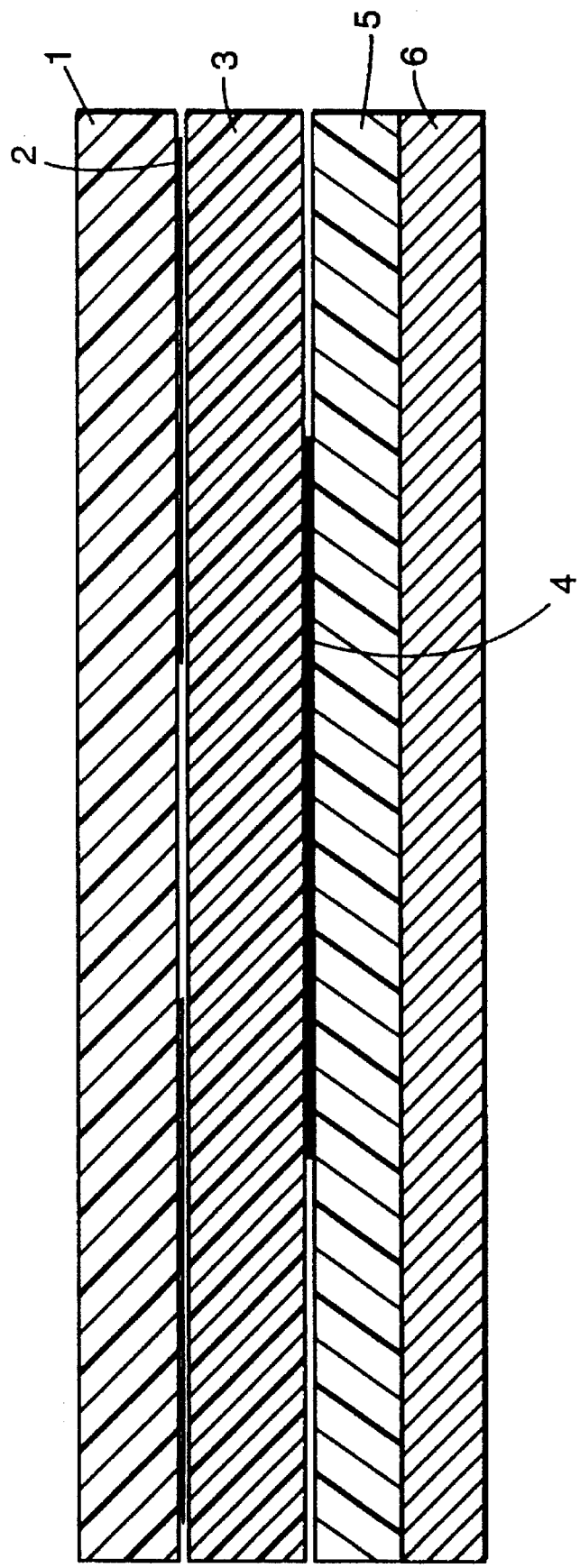

FIG. 1 a security laminate described in the state-of-the-art (Basic construction according to DE-A-36 08 907) in intact condition FIG. 2 the laminate of FIG. 1 after a tampering attempt FIG. 3 an embodiment of the transparent multilayer film of the present invention in intact condition FIG. 4–8 embodiments of the transparent multilayer film of the present invention after a tampering attempt The figures, which are not drawn to scale, are provided to further elucidate the invention, but are not intended to restrict the invention in any manner to the embodiments represented therein.

In FIG. 1, showing the security laminate of the prior art, 1 is the cover layer, made of polyethylene terephthalate for example, which can be printed with information, like a price, for example, when the laminate is used as a label. Under this layer is a pattern 2 of adhesion-regulating material which bonds the cover layer to the damagable layer 3. This layer 3 is thin and is created by aluminum vapor coating, for example. It can also be made of a brittle resin layer coated with UV ink or it can be a layer of only ink. In this case, this layer also fulfills the characteristics desirable for the verification marking 4. Under this flat two-dimensional layer is an adhesive layer 5, which serves to bond the laminate to the substrate 6.

On attempts to remove the laminate or label, the adhesive layer 5 remains completely on the substrate 6, while the damagable layer/verification marking ¾ divides itself between the substrate and the cover layer 1, depending on the presence or absence of the adhesion-regulating material, as shown in FIG. 2. Due to the transparency of the cover layer, which in the case of a price tag carries the information to be tampered with, the parts of the non-transparent damagable layer ¾ remaining on the substrate render the manipulation visible. The tamperer has largely a problem which is two-dimensional and purely optical. This means that by simply removing the residues of the non-transparent damagable layer from the substrate or by application of a suitable ink on the substrate or cover layer, the tampering can be concealed. Because of the limited thickness of the damagable layer, a manually detectable change in the surface of the laminate is not present.

FIG. 3 shows an embodiment of the transparent multilayer film of the present invention in intact form. As in the previous figures, 1 is a transparent cover layer which is bonded—over a pattern of adhesion-regulating material 2—to a damagable layer 3. This layer shows a definite three-dimensional structure with a thickness of at least 10 µm. Beneath the damagable layer 3 is a verification marking 4. Then the adhesive layer 5 and the substrate 6 follow.

Figure 4:
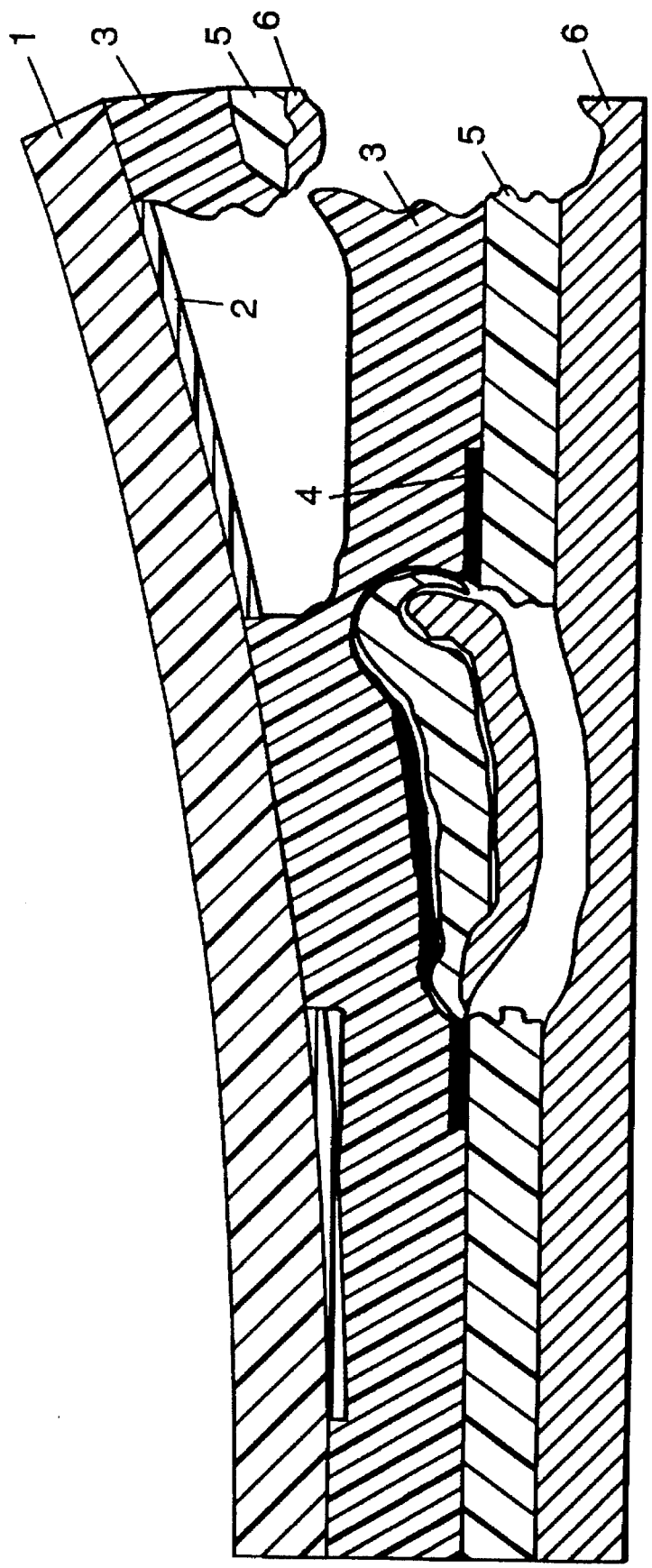
Figure 5:
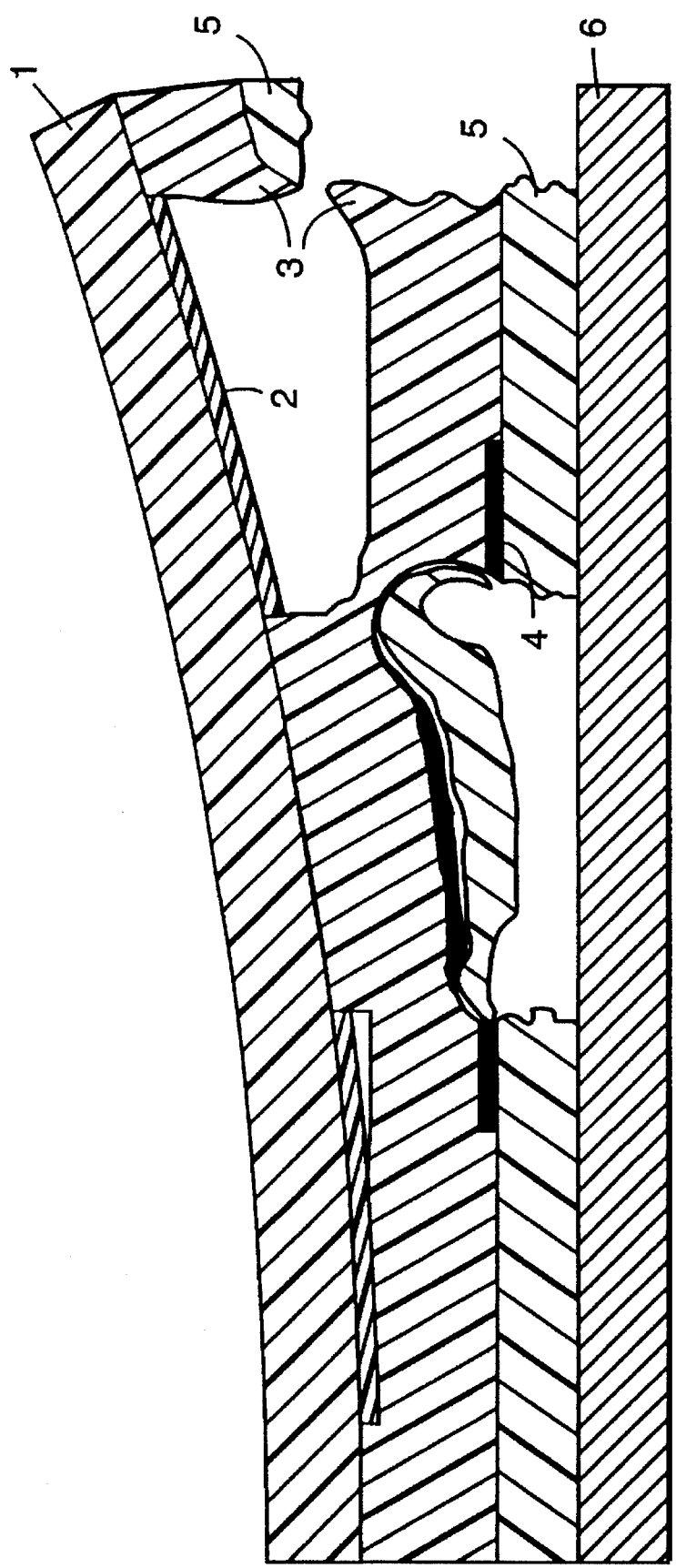
Figure 6:
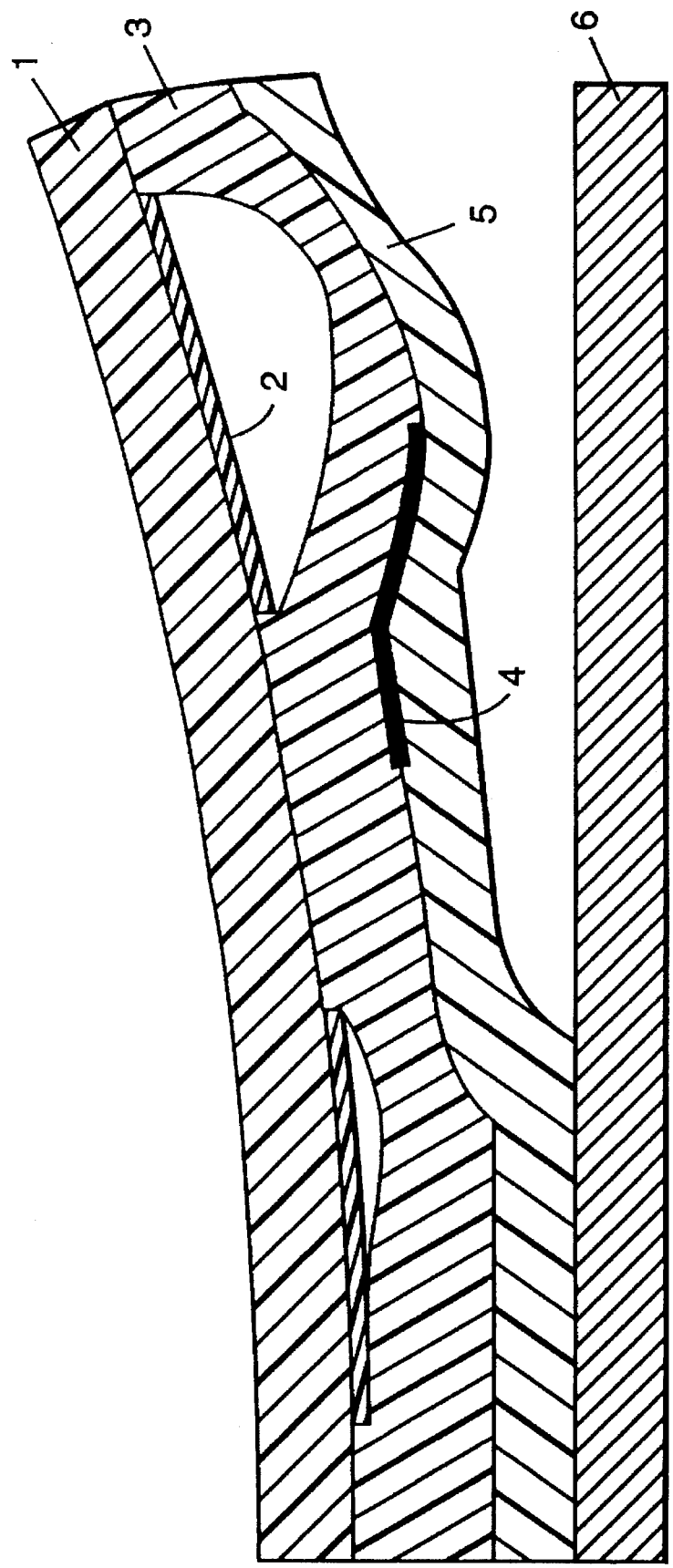

In case of a tampering attempt, information which is under the security laminate, namely on the document 6, is manipulated or replaced and then the altered document 6 is relaminated to the protective multilayer film. This is prevented, however, by the multilayer film of the invention because the laminate cannot be removed from the substrate without being destroyed. If attempts are made to remove the film from the document, then the damagable layer 3 stretches irreversibly in a manner prescribed by the pattern-coating of adhesion-regulating material 2. If removal forces continue to be applied, then the film breaks at its weakest point and the layer 3 is either divided between the document 6 and the cover layer 1 or remains on the cover layer 1 in the form of a waved sheet, the waves being caused by irreversible stretching of layer 3. This behavior results from the good adhesion of the layer 3 to the adhesive layer 5 and to the cover layer 1 in the areas where no adhesive repellent coating is present. As shown in FIGS. 4 through 6, the damagable layer 3 separates from the cover layer in areas where the adhesion-regulating pattern 2 is present, but remains adhered to the cover layer in all other areas. When attempts are made to remove the cover layer 1, the damagable layer is stretched irreversibly. Upon further pulling, the break occurs in different manners depending upon the respective cohesive strengths. The break can thus occur, for example, directly through the layer 3 and 5 accompanied by portions of the substrate 6 (See FIG. 4), through the layers 3 and 5 with partial separation from the substrate 6 (See FIG. 5), where in both cases the verification marking is also destroyed, or by complete separation from the substrate when the adhesive strength f of layer 5 to the substrate 6 is less than the cohesive strength c' of the stretched layer 3 and e of the layer 5.

During attempts to remove the multilayer film of the invention from the document, the tamperer is not only confronted with partial destruction of a two-dimensional ink/verification marking ¾ as in the state-of-the-art, but also with a three-dimensional problem because the damagable layer 3 (and the adhesive layer 5) is excessively stretched and waved and fragments of it 9 (and the adhesive layer 5) are present on both the cover layer I and the document 6. These residues must be removed before the document and laminate are pressed together again, because otherwise a document with a surface unevenness which can be felt by the hand will result. Because the verification marking 4, as shown in FIGS. 4 and 5, is destroyed as well, simple application of a new transparent film is not effective. The complete removal of the residues of the damagable layer with a solvent would in certain embodiments also completely remove the verification marking 4.

Figure 7:
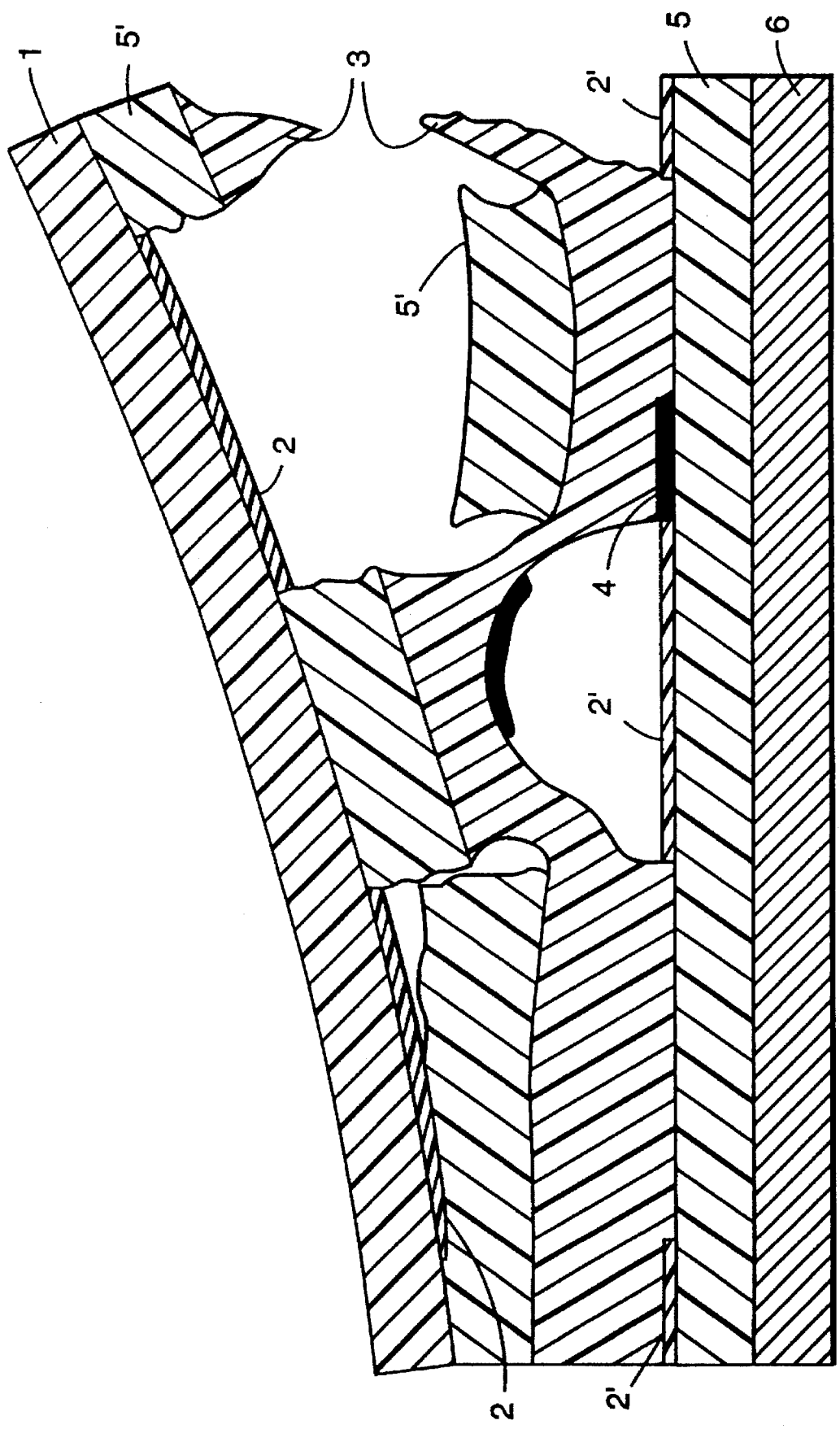

FIG. 7 shows an embodiment of the transparent multilayer film of the invention where adhesive layers 5 and 51 and a pattern of adhesion-regulating material 2 and 21 are provided on both sides of the damagable layer 3. Tampering attempts result in a behavior similar to that depicted in FIGS. 4–6. The damagable layer 3 and, in this case, the upper adhesive layer 5' are completely destroyed as a result of the irreversible extension of the damagable layer 3.

Figure 8:
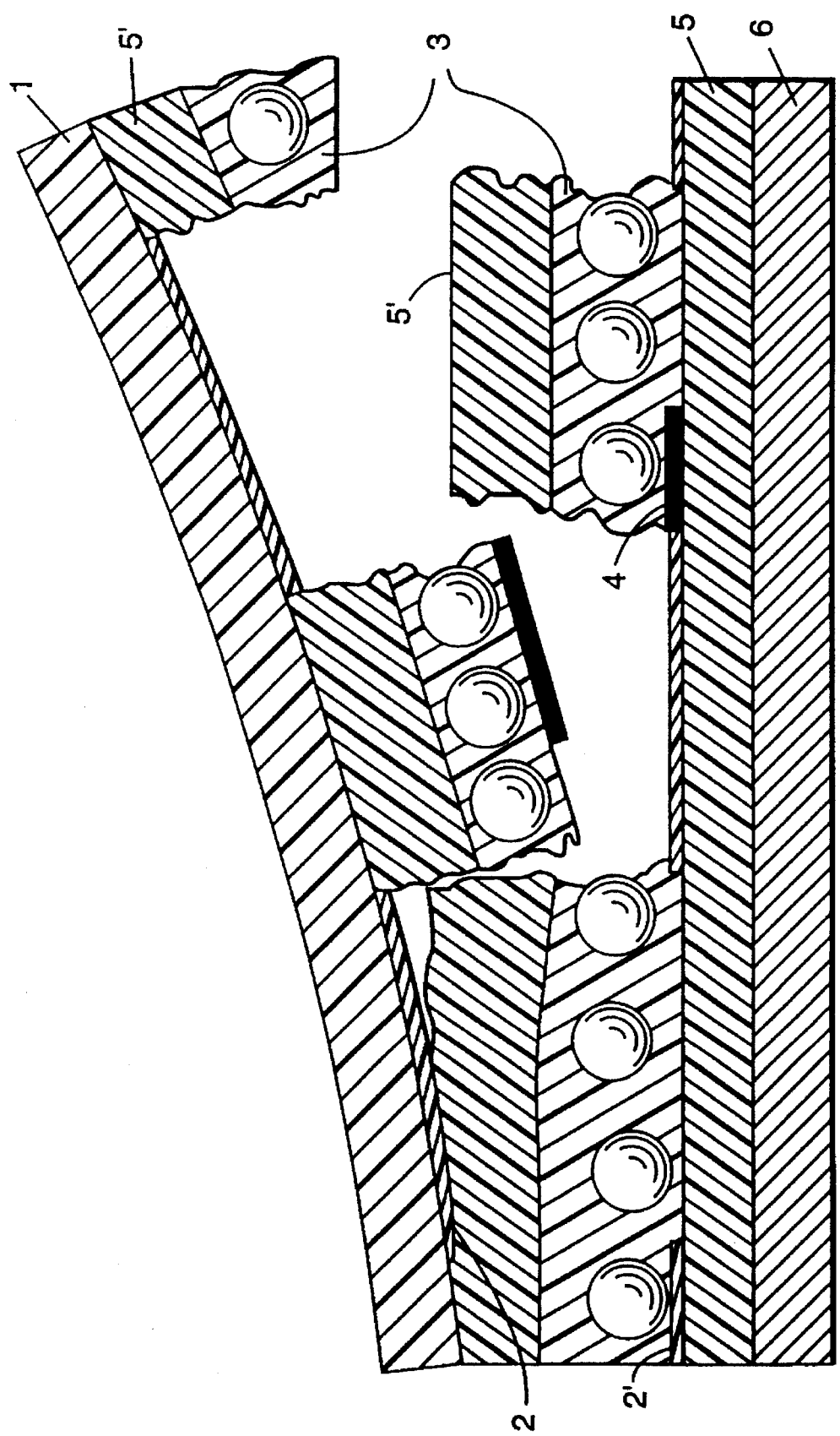

FIG. 8 shows a further embodiment of the invention where the damagable layer 3 comprises a brittle, frangible material containing a transparent filler (glass microspheres) which contributes further to brittleness. In this embodiment as well, the damagable layer 3 and the upper adhesive layer 5' distribute themselves between the cover layer and the substrate in a pattern prescribed by the pattern of adhesion-regulating material 2 and are irreversibly destroyed.

An important advantage of the transparent multilayer film of the present invention exists in that lilting of the film from the document without damage to the damagable layer, performed by applying a support to the film in advance, is impossible even for professional tamperers because the damagable layer is present in the interior of the laminate and is strongly adhered to adjacent layers. Reconstruction of the tampered document is made substantially more difficult or impossible because the damagable layer in the preferred embodiment of the invention is irreversibly deformed before it finally breaks. The transparent multilayer film of the invention is especially suitable for this reason as a highly tamper-proof laminate for protection of data on documents and as a tamper-proof label.

This suitability for use on documents or as a label is further increased by the high transparency of the film. Thus the substrates covered by the film are still machine readable as there are no surface irregularities to cause light scattering.

The following examples serve to illustrate the invention, without limiting it in scope.

EXAMPLE 1

A transparent multilayer film, as shown in FIG. 3, is prepared in the following manner. A dot pattern 2 of a mixture of a silicone-acrylate mixture [Th. Goldschmidt AG: RC 726/KN. 7060=70/30 weight per cent] together with 3 weight per cent 2-hydroxy-2-methyl-1-phenyl-propane-1-one as photoinitiator [Merck: Darocure 1173] is applied to a 50 μm thick corona discharge treated polyester film (PET) 1 using a suitably embossed roll built into a 5-roll coating system. The pattern coating 2 covers 25% of the surface of the film and the diameter of the dots is 0.5 cm. The coating is then cured using a high pressure mercury lamp under inert gas conditions. The coating weight is 5 g/m$^2$.

A 40 μm thick ethylene vinyl acetate film 3 (hot-melt adhesive) [Guttacoll: PE90/40; ethylene/vinyl acetate=82/18] which is corona discharge treated on both sides is then laminated to the printed side of the PET film 1 using a commercially available heat laminator at 130° C. Then a 50 μm thick layer of acrylate-based pressure-sensitive adhesive 5 (tackified with resin; 3M Transfer Tape #9482, modified by omission of glass fibers, referred to herealter as "PSA 1") in the form of a transfer film on a release paper 6 is laminated to the layer of hot-melt adhesive at room temperature.

The release paper 6 is then removed and the laminate pressed onto a document 6 (Papierfabrik Lahnstein: Neobond] using a commercially available laminafor at room temperature. After 24 hours aging, the laminate is carefully removed by hand from the document. In the areas of the dot pattern 2, the PET film 1 separates from the ethylene vinyl acetate 3, while in the remaining areas it continues to adhere. Thus the ethylene vinyl acetate layer stretches until it finally breaks. The layer of pressure-sensitive adhesive 5 stretched as well and is destroyed, whereby the surface of the document 6 is damaged as well. Compare with FIG. 4 (with no verification marking 4) and Table I. After the complete removal of the laminate from the document 6, dot-shaped residues of ethylene vinyl acetate layer 3 and adhesive 5 remain on the surface of the document, these dot-shapes being missing from the laminate which has been removed. Portions of the document paper are also adhered to the adhesive remaining on the laminate. Due to the non-elastic deformation of the ethylene vinyl acetate layer 3, the residues are not regular and even, so that on attempt to relaminate an uneven surface is obtained and air bubbles remained entrappeal in the laminate.

EXAMPLE 2

Example 1 is repeated, with the exception that a 25 μm thick acrylate-based adhesive layer 5 (tackified with resin; 3M Transfer Tape #9458; referred to hereafter as "PSA 2").

When the laminate is removed from the document, it is stretched and destroyed in a manner similar to that described in Example 1, as shown in Table I.

EXAMPLE 3

Example 1 is repeated, with the exception that an ethylene vinyl acetate film 3 (corona treated on only the side towards the PET) is laminated to the PET film 1.

When the laminate is removed from the document, it is stretched and destroyed in a manner similar to that described in Example 1, as shown in Table I.

EXAMPLE 4

Example 2 is repeated with the ethylene vinyl acetate film described in Example 3 (corona-treated on one side).

When the laminate is removed from the document, it is stretched and destroyed in a manner similar to that described in Example 1, as shown in Table I.

EXAMPLE 5

Example 1 is repeated, with the exception that a 50 μm thick film of ethylene vinyl acetate 3 [DuPont Elvax 550, ethylene vinyl acetate=85/15](corona treated on both sides) is used.

When the laminate is tested as in Example 1, the cover layer 1 delaminates from the damagable layer 3 together with the-adhesion repellent pattern 2. Layers 3 and 5 remain on the document surface, whereby 3 is stretched slightly upwards, because the adhesive strength (a) is greater than the cohesive strength (c) at 5% elongation.

TABLE 1

| | Adhesive strength (a) and (d), cohesive strength (c) of different materials | | | | |
|---|---|---|---|---|---|
| Example | Damagable layer (3) | Adhesion (a) between layers (1) and (3) N/0.5 inch | psa-layer (5) | Internal strength (c) of the damagable layer (3) N (5% elongation/ 10% elongation/break) | Adhesion (d) between layers (3) and (5) N/0.5 inch |
| 1 | EVA, Guttacoll PE90, both sides corona treated | 7.7 | psa 1 | 1.4/2.0/4.0 | 8.9 |
| 2 | EVA, Guttacoll PE90, both sides corona treated | 7.7 | psa 1 | 1.4/2.0/4.0 | 7.9 |
| 3 | EVA, Guttacoll PE90, one side (facing (1)) corona treated | 7.7 | psa 1 | 1.4/2.0/4.0 | 10.2 |
| 4 | EVA, Guttacoll PE90, one side (facing (1)) corona treated | 7.7 | psa 2 | 1.4/2.0/4.0 | 8.8 |
| 5 | EVA, Elvax 550, both sides corona treated | 5.6 | psa 1 | 2.3/3.0/5.1 | 9.5 |
| 6 | EVA, Elvax 550, both sides corona treated | 5.6 | psa 2 | 2.3/3.0/5.1 | 6.0 |
| comp. ex. 1 | Ethylene-Methacrylic acid (Surlyn 1706) | 3.2 | psa 1 | 6.7/7.7/7.8 | — |
| comp. ex. 2 | Ethylene-Methacrylic acid (Primacor 1410 XT) | 4.0 | psa 1 | 3.2/4.1/6.5 | — |

When the laminate is removed from the document, it is stretched and destroyed in a manner similar to that described in Example 1, as shown in Table I.

EXAMPLE 6

Example 2 is repeated using the ethylene vinyl acetate film (corona treated on both sides) described in Example 5.

When the laminate is removed from the document paper, it is stretched and destroyed in a manner similar to that described in Example 1, as shown in Table I.

COMPARATIVE EXAMPLE 1

Example 1 is repeated, with the exception that a 25 μm thick film of the ionomer ethylene methacrylic acid [DuPont: Surlyn 1706] (corona treated on both sides) is used as layer 3.

When the laminate is tested as in Example 1, the cover layer 1 delaminates from the damagable layer 3 together with the adhesion repellent pattern 2, because the adhesive strength (a) is less than the cohesive strength (c). Layers 3 and 5 remain undamaged on the document surface. (The cohesive strength (c) at 5% elongation is already greater than the adhesive strength (a); see Table I.)

COMPARATIVE EXAMPLE 2

Example 1 is repeated, with the exception that a 50 μm thick film of the ionomer ethylene acrylic acid (Dow: Primacor 1410 XT] (corona treated on both sides) is used as layer 3.

EXAMPLE 7

Example 1 is repeated, with the exception that the ethylene vinyl acetate layer 3 is additionally printed with a security print 4 based on a solvent-containing screen-printing ink to which a shiny, pearl-like pigment [Merck: Iriodin 235] has been added. The security print is destroyed as well when the laminate is removed from the document 6. See FIG. 4.

EXAMPLE 8

Example 1 is repeated, with the exception that a hologram 4 is laminated to the adhesive layer 5, before the adhesive layer is laminated to the EVA layer 3. The hologram is destroyed when the laminate is removed from the document 6.

EXAMPLE 9

Example 1 is repeated, with the exception that a 50 μm thick polyester film [Guttacoll: PE 52/50] is used as layer 3.

When the laminate is removed from the document, it is stretched and destroyed in a manner similar to that described in Example 1, as shown in Table I.

EXAMPLE 10

Example 1 is repeated, with the exception that a 50 μm thick polyamide film [Guttacoll: PE 71/50] is used as layer 3.

When the laminate is removed from the document, it is stretched and destroyed in a manner similar to that described in Example 1, as shown in Table I.

EXAMPLE 11

Example 1 is repeated, with the exception that a dot pattern 2 of an aqueous-based silicone system [Dow: 1171] with 3 weight per cent of a catalyst [Dow: 1171A] is applied with the aid of a patterned roller and cured by drying at 150° C.

EXAMPLE 12

A checkerboard pattern of an aqueous solution of an adhesion-reducing (to PET) ethylene acrylic acid copolymer [Morton Int.: Adcote 50T4983 1 is applied to a 125 µm thick polyester film (PET) using a flexographic printing system. The coating covers 50% of the surface and the pattern squares are 0.3 cm in length and width. The coated film is then dried in an oven, resulting in a coating weight of 5 g/m².

Next, a verification marking comprising a mixture of 65 parts of a water-based polyurethane ink [Miles Inc.: Bayhydrol 123], 5 parts water and 30 parts pearl-like pigment based on titanium dioxide is printed onto the pattern-coated side of the PET film.

Then the printed side of the PET is corona treated.

A 50 µm thick film 3 of ethylene vinyl acetate (hot melt adhesive) [DuPont: Elvax 550, ethylene/vinyl acetate=85/15] (corona-discharge-treated on both sides) is then laminated to the printed, corona treated side of the PET film using a commercially available heat laminator at 130° C. Finally, a 25 µm thick layer of a pressure-sensitive adhesive 5 (PSA 2) in the form of a transfer film on release paper 6 is laminated to the ethylene vinyl acetate layer 3.

The laminate thus obtained is pressed onto a document as described in Example 1.

When the laminate is removed from the document, it is stretched and destroyed in a manner similar to that described in Example 1, as shown in Table I.

EXAMPLE 13

Example 11 is repeated, with the exception that a second adhesive repellent pattern 21 is applied under the ethylene vinyl acetate layer 3, said second pattern 2' not being superimposable with the first adhesive repellent pattern 2.

The laminate thus obtained is pressed onto a document as described in Example 1.

When the laminate is removed from the document paper, it is stretched and destroyed in a manner similar to that described in Example 1, as shown in Table I.

EXAMPLE 14

A transparent multilayer film of the type shown in FIG. 7 is prepared by the following method. A dot pattern of a mixture of an epoxysilicone [General Electric Company.: UV9300] and 3% of a photoinitiator [General Electric Co.: UV9310 C] is applied to a 50 µm thick polyester (PET) film 1 (Hoechst: Hostaphan RN 2900] (primed on one side) using a suitably embossed coating roll built into a 5-roll coating system. The pattern coating covers 25% of the surface of the film and the diameter of the dots is 0.5 cm. The coating is cured using a high pressure mercury lamp. The coating weight is 5 g/m².

A 25 µm thick film of acrylate-based pressure sensitive adhesive 5 (PSA 2) in the form of a transfer film on a release paper is laminated to the printed side of the PET film at room temperature. The release paper is removed and then a 35 µm thick, non-oriented polyolefin film 3 [Amerplast: Amprop PP 609] is laminated to the adhesive surface at room temperature. The polyolefin film has been corona treated on both sides and then coated on both sides with an adhesion promoter (primer) based on chlorinated polypropylene [Tramaco: Trapylen 822]. The coating weight of the primer, applied with a doctor blade, is 0.5 g/m². Then a second pattern 2' of silicone material is printed on the polyolefin film in the same manner as described previously, except that the second pattern is not directly superimposable over the first silicone pattern 2. Then a further 25 µm thick layer of acrylate-based pressure-sensitive adhesive 5 (PSA 2) in the form of a transfer film on release paper 6 is laminated to the polyolefin film 3 at room temperature.

The laminate thus obtained is pressed onto a document 6 as described in Example 1.

When the laminate is removed from the document, it is stretched and destroyed in a manner similar to that described in Example 1, as shown in Table I.

EXAMPLE 15

Example 13 is repeated, with the exception that a non-oriented 30 µm thick polypropylene film is used as layer 3 [Dickel & Co.: Sarafan PPST 300].

The laminate thus obtained is pressed onto a document 6 as described in Example 1.

When the laminate is removed from the document, it is stretched and destroyed in a manner similar to that described in Example 1, as shown in Table I.

EXAMPLE 16

A transparent multilayer film of the type shown in FIG. 7 is prepared by the following method. A dot pattern of a solvent-based silicone addition system [Wacker Chemie GmbH: 100 parts Dehesive 940, 3.6 parts Katalysator OL and 1 part crosslinker V93] is printed onto the primed side of a 19 µm thick polyester film using screen printing. The coating covers 25% of the surface of the film and the diameter of the dots is 0.5 cm. The coating is then dried and cured in an oven at 100° C. The coating weight is 5 g/m².

A 25 µm thick layer of acrylate-based pressure sensitive adhesive 5 (PSA 2) in the form of a transfer film on release paper is laminated to the printed side of the PET film 1 at room temperature.

The release paper is removed and a 25 µm thick non-oriented polyolefin film 3 [Dow: LLDPE Dowlex 2047] laminated onto the construction. The polyolefin film 3 has been previously corona treated on both sides and primed using a doctor blade (0.5 g/m²) with a primer based on chlorinated polypropylene [Polychimie: polyprime DF20].

Then a second pattern 2' of silicone material is applied to the pretreated polyolefin film 3, as in Example 13, in a manner so that the pattern 2' is not superimposable with the first pattern 2.

Then a further layer 5 comprising a 25 µm thick coating of acrylate-based pressure-sensitive adhesive (PSA 2) in the form of a transfer film on release paper 6 is laminated to the polyolefin film layer at room temperature.

The laminate thus obtained is pressed onto a document as described in Example 1.

When the laminate is removed from the document, it is stretched and destroyed in a manner similar to that described in Example 1, as shown in Table I.

EXAMPLE 17

A transparent multilayer film of the type shown in FIG. 8 is prepared by the following method. A dot pattern 2 of a solvent-based silicone addition system [Wacker Chemie GmbH: 100 parts Dehesive 940, 3.6 parts Katalysator OL and 1 part crosslinker V93] is printed onto the primed side of a 19 µm thick polyester film 1 [Hoechst: Hostaphan RN2900] using screen printing techniques. The coating covers 25% of the surface of the film and the diameter of the dots is 0.5 cm. The coating is then dried and cured in an oven at 100° C. The coating weight is 5 g/m².

A 25 µm thick layer of acrylate-based pressure sensitive adhesive 5' (PSA 2) in the form of a transfer film on release paper is laminated to the printed side of the PET film 1 at room temperature. The release paper is removed and a 75 µm thick layer of a brittle acrylate polymer 3, mounted on release paper as well, is then laminated to the adhesive surface. This material is made by mixing a commercially available solution of an acrylate polymer which crosslinks upon drying (100° C.) through amide groups [Ernst Jäger GmbH: Jagotex SV211 or SV212] to which 20 weight per cent (based on per cent solids) of glass microspheres (50 µm diameter) has been added. After removal of the release paper, a second dot pattern 2' is printed onto the brittle layer 3 in the manner described in Example 13, that is, not directly superimposed over the first pattern 2. Then a second acrylate-based pressure-sensitive adhesive layer 5 (PSA 2) in the form of a transfer film on release paper 6 is laminated to the brittle layer.

The laminate thus obtained is pressed onto a document 6 as described in Example 1. When the laminate is removed from the document, layer 3 stretches and breaks.

EXAMPLE 18

Example 16 was repeated, with the exception that Jagotex SV212 was used instead of Jagotex SV211 and that only 10% glass microspheres were added.

The laminate thus obtained is pressed onto a document 6 as described in Example 1. When the laminate is removed from the document, layer 3 stretches and breaks.

Testing and Evaluation of the Adhesive and Cohesive

Characteristics of the Multilayer Films

1. Adhesion of the damagable layer 3 to the cover layer 1
   A 1.27 cm wide-strip of aluminum was laminated using different types of hot-melt adhesive strips (1.27 cm wide) shown in Table I to PET at 130° C. The test samples were then subjected to a 180° peel test. The adhesive strength was measured in N/1.27 cm.
   The PET cover layer as well as the hot-melt adhesive layer were tested in both corona-treated and untreated form. As can be seen from the results, corona treatment of both surfaces increases adhesion. In cases where PET and heat-activated adhesive are used, then the anchorage to PET is very good without pretreatment.
   One experiment showed that changing the thickness of the layer of hot-melt adhesive from 40 µm to 60 µm had no influence on the adhesion.
2. Tensile strength and elongation of the damagable film (3) as a function of thickness and material, measured in N
   The tensile strength was measured at 5% and 10% elongation, as well as at the breaking point. The test speed was 300 mm/min. Tests showed that the test speed had no significant influence on the values at elongations of 5 and 10%. Breaking of the film occurred at about 500% elongation.
3. Adhesion of the damagable layer 3 to adhesive layer 5
   A 1.27 cm wide laminate of hot melt adhesive strips 3 and PSA 5 were laminated together at 130° C. between two aluminum strips and then subjected to a 180° peel test. The values were recorded in N/1.27 cm.
4. Adhesion of PSA layer 5 to the document 6
   Adhesive strength was measured using a paper frequently used for documents [Papierfabrik Lahnstein: Neobond]. The removal angle was 90°. The removal test was conducted after the aging 24 hours at 90° C. The test stripes were 1.27 cm wide. Two pressure-sensitive adhesives (PSA 1 and PSA 2) were tested, both acrylate-based materials, whereby the following results were obtained: PSA 1: 12.2 N/1.27 cm
   PSA 2: 10.5 N/1.27 cm

What is claimed is:

1. Transparent multilayer film, comprising a cover layer, a damagable layer, a pattern of adhesion-regulating material between said layers, and a first adhesive layer on the side of the film opposite that of the cover layer, for bonding with a substrate, characterized in that damagable layer (3) has a thickness of at least 10 µm and that the cohesive strength of the damagable layer (3) and the adhesive strength between the layers obeys the following relationship:

a and d>c>b
   whereby
   a is the adhesive strength between cover layer (1) and damagable layer (3) in the areas where no adhesion-regulating material (2) is present,
   b is the adhesive strength between cover layer (1) and damagable layer (3), in the areas where adhesion-regulating material (2) is present,
   c is the cohesive strength of damagable layer (3), and
   d is the adhesive strength between layer (3) and first adhesive layer (5).

2. Multilayer film according to claim 1, characterized in that the cohesive strength e of the first adhesive layer (5) is about the same as or greater than the cohesive strength c of the damagable layer (3).

3. Multilayer film according to claim 1, characterized in that said damagable layer (3) is a destructible or an irreversibly deformable layer.

4. Multilayer film according to claim 1, characterized in that the damagable layer (3) comprises a hot-melt adhesive or a pressure sensitive adhesive.

5. Multilayer film according to claim 4, characterized in that the hot-melt adhesive is an ethylene vinyl acetate that comprises an (EVA) copolymer, an ethylene acrylic acid copolymer, an ethylene methacrylic acid copolymer, a polyester, a polyurethane or a polyamide.

6. Multilayer film according to claim 1, characterized in that a second adhesive layer (51) is present between the cover layer (1) or pattern of adhesion-regulating material (2), respectively, and the damagable layer (3), said second adhesive layer behaving like said first adhesive layer (5) with respect to its cohesive strength and adhesion to the damagable layer (3).

7. Multilayer film according to claim 1, characterized in that a further pattern of adhesion-regulating material (2'), not superimposable with the first pattern of adhesion-regulating material (2), is present between the damagable layer (3) and said first adhesive layer (5), said further pattern behaving like material (2) with respect to its adhesion to layers (3) and (5).

8. Multilayer film according to claim 6, characterized in that the damagable layer (3) comprises a non-oriented polypropylene, a linear low density polyethylene (LLDPE) or a hot-melt adhesive.

9. Multilayer film according to claim 6, characterized in that the damagable layer (3) comprises a brittle, frangible material.

10. Multilayer film according to claim 9, characterized in that the damagable layer (3) contains a filler which increases the brittleness of the layer.

11. Multilayer film according to claim 1, characterized in that the cover layer (1) comprises an abrasion-resistant polymeric film.

12. Multilayer film according to claim 11, characterized in that the cover-layer (1) comprises a corona-treated or primed polyethylene terephthalate (PET) film.

13. Multilayer film according to claim 1, characterized in that the adhesion-regulating material (2) or (2'), respectively, is an adhesion-reducing or adhesive repellent material.

14. Multilayer film according to the claim 1, characterized in that the first or second adhesive layer (5) or (5'), respectively, comprises a layer of pressure-sensitive adhesive (PSA) or a hot-melt adhesive.

15. Multilayer film according to claim 4, characterized in that the damagable layer (3) is corona-treated on the side facing the cover layer (1).

16. Multilayer film according to claim 8, characterized in that the damagable layer (3) is treated on both sides to improve adhesion to adjacent layers.

17. Multilayer film according to claim 1, characterized in that a verification marking (4) is provided within the film or between the film and the substrate (6).

18. Multilayer film according to claim 17 characterized in that said verification marking (4) is associated with said damagable layer (5) so that damage to the damagable layer (5) results in irreversible damage to said verification marking (4).

19. Multilayer film according to claim 1, characterized in that the cohesive strength c of the damagable layer (3) is lower than the cohesive strength of the cover layer (1).

20. The transparent multilayer film according to claim 1, wherein the film overlies a document.

21. The transparent multilayer film according to claim 1, wherein the film is adhered to a surface and functions as a tamper-proof label.

22. Tamperproof document or label, comprising a multilayer film according to claim 1, bonded by means of an adhesive layer (5) to a data carrier (6), whereby the adhesive strength fbetween the adhesive layer (5) and the data carrier (6) is about the same as or greater than the cohesive strength c of the layer (3) and/or the cohesive strength e of the adhesive layer (5).

* * * * *

UNITED STATES PATENT AND TRADEMARK OFFICE
CERTIFICATE OF CORRECTION

PATENT NO. : 5,629,093
DATED : May 13, 1997
INVENTOR(S) : Katharina J. Bischof, Luigi Pastore, Wilhelm Kuester and Lynn E. Faykish It is certified that error appears in the above-indentified patent and that said Letters Patent is hereby corrected as shown below:

Col. 8, line 1, "DETAILED DESCRIPTION OF THE INVENTION" should be deleted here and inserted at Col. 8, after line 14 before the next paragraph.

Col. 18, line 24, "fbetweeen" should read --f between--.

Signed and Sealed this

Twenty-fifth Day of August, 1998

Attest:

BRUCE LEHMAN

Attesting Officer

Commissioner of Patents and Trademarks